Figure 1:
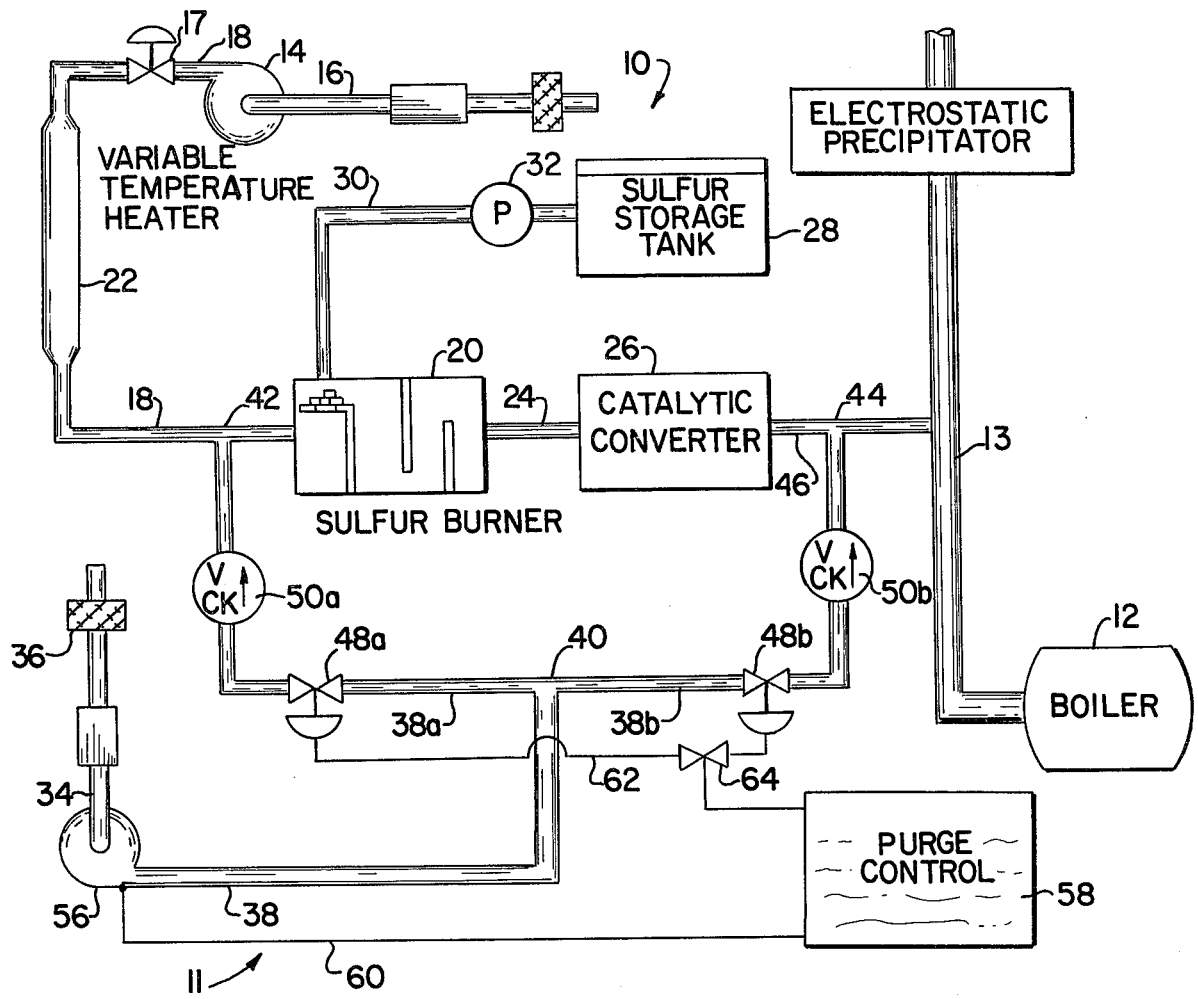

United States Patent [19]

Southam

[11] Patent Number: 4,466,815

[45] Date of Patent: * Aug. 21, 1984

[54] GAS CONDITIONING APPARATUS

[75] Inventor: Barry J. Southam, San Juan Capistrano, Calif.

[73] Assignee: Wahlco International Inc., Wilmington, Del.

[ * ] Notice: The portion of the term of this patent subsequent to Jun. 8, 1999 has been disclaimed.

[21] Appl. No.: 374,516

[22] Filed: May 3, 1982

[51] Int. Cl.³ .............................................. B03C 3/16
[52] U.S. Cl. .......................................... 55/122; 55/5; 423/215.5; 423/522; 422/117
[58] Field of Search ................... 55/5, 122; 423/215.5, 423/522; 422/117; 431/29, 121

[56] References Cited

U.S. PATENT DOCUMENTS

| | | | |
|---|---|---|---|
| 3,381,896 | 5/1968 | Winters | 431/121 |
| 3,704,569 | 12/1972 | Hardison et al. | 55/5 |
| 3,722,178 | 3/1973 | Aaland et al. | 55/5 |
| 3,837,784 | 9/1974 | Delatronchette | 431/79 |
| 3,893,832 | 7/1975 | Perry et al. | 55/279 |
| 3,993,429 | 11/1976 | Archer | 55/5 |
| 4,070,424 | 1/1978 | Olson et al. | 55/5 |
| 4,179,071 | 12/1979 | Kozacka | 264/262 |
| 4,208,192 | 6/1980 | Quigley et al. | 423/215.5 |
| 4,333,746 | 6/1982 | Southam | 55/5 |

Primary Examiner—Bernard Nozick
Attorney, Agent, or Firm—Howard E. Sandler

[57] ABSTRACT

A gas conditioning apparatus for conditioning flue gases and more particularly an improved means for purging a gas conditioning system of latent or residual sulfur trioxide which is normally produced by the gas conditioning system for conditioning of flue gases.

9 Claims, 2 Drawing Figures

GAS CONDITIONING APPARATUS

Known systems for removing fly ash from the flue gases of fossil fuel combustion, for example coal, often include an electrostatic precipitator. The fly ash arresting capability of an electrostatic precipitator may depend upon numerous variables, not the least of which is the surface resistivity of the ash. It is well known that a high sulfur content in coal favorably influences fly ash precipitation by reducing the surface resistivity of the ash. However, when coal with a sulfur content of less than 1% is burned in a boiler, the combustion often does not form sufficient sulfur trioxide to reduce the resistivity of the fly ash to a level at which an electrostatic precipitator can function efficiently (approximately $5 \times 10$ to the 10th power ohm-cm).

As an amplification of the above, substantially the entire sulfur content of coal, which may vary from less than 1% to approximately 6%, oxidizes to sulfur dioxide during combustion of the coal, and from 1% and 5% of such sulfur dioxide further oxidizes to sulfur trioxide. Typically, after combustion the injected sulfur trioxide component of the flue gases combines with entrained moisture to form sulfuric acid which then condenses on the fly ash particulate as the flue gases cool. The sulfuric acid which condenses on the fly ash particulate generally dictates the electrical resistivity of such particulate. Thus, in instances where low sulfur coal is burned in the boiler, only relatively small quantities of sulfuric acid are generated and, hence, the electrical resistivity of the fly ash is relatively high. Accordingly, when burning low sulfur coal, collecting efficiency of the electrostatic precipitator may be degraded considerably, particularly in instances where the precipitator is designed to receive flue gases at temperatures corresponding generally to normal stack exit temperatures (i.e., 250° F. to 320° F.).

Alternative systems have been developed in attempts to rectify the problems of high resistivity fly ash removal by electrostatic precipitators. Examples of such alternative systems have included utilizing: hot-side precipitators; enlarged coldsided precipitators; bag houses; or flue gas conditioning. In many instances experience has shown that the use of flue gas conditioning is the most satisfactory solution in terms of reliability, efficiency, cost, space requirements and versatility.

In those instances of flue gas conditioning systems, the gas conditioning means and the method of the type illustrated in U.S. Pat. No. 3,993,429 has proved to be an overwhelming success. For purposes of background the entire content of said U.S. Pat. No. 3,993,429 is hereby incorporated herein and made a part hereof by reference. In these and other systems, a controlled trace amount of sulfur trioxide is injected into the flue gas stream intermediate the boiler and the electrostatic precipitator to thus bring the surface resistivity of the fly ash into the desired range for efficient collection thereof by the precipitator.

Experience has illustrated that a variety of operating parameters is important in the proper functioning of the flue gas conditioning system of the type illustrated in U.S. Pat. No. 3,993,429. Several such features are disclosed in U.S. Pat. application Ser. No. 257,343, filed Apr. 24, 1981 now U.S. Pat. No. 4,333,746, which is the invention of the inventor herein and is assigned to the same assignee as is this Application. The entire content of said application Ser. No. 257,343 now U.S. Pat. No. 4,333,746 is hereby incorporated herein by reference.

The present invention concerns a sulfur trioxide flue gas conditioning system such as one for conditioning the flue gas from a boiler means and which may be similar in many respects to those described in the hereinabove referenced U.S. Patent and pending Application. According to the present invention such a flue gas conditioning system is provided with an improved purge means including appropriate controls, valving, and air induction means to permit effective purging of residual sulfur dioxide and sulfur trioxide from the system under various conditions of both normal and abnormal or emergency shutdown. Accordingly, the present invention permits enhanced purging capability over prior purge systems which have commonly included little more than a means for directing purge air into the system downstream from the point of origination of sulfur dioxide and sulfur trioxide in the system. These prior purge systems thus have purged only that system portion from the purge air inlet to the boiler flue. The present invention offers improved purging capability by permitting purge air to be directed into the conditioning system at selected alternate points according to the nature of the circumstances in which the purge is initiated.

Figure 2:
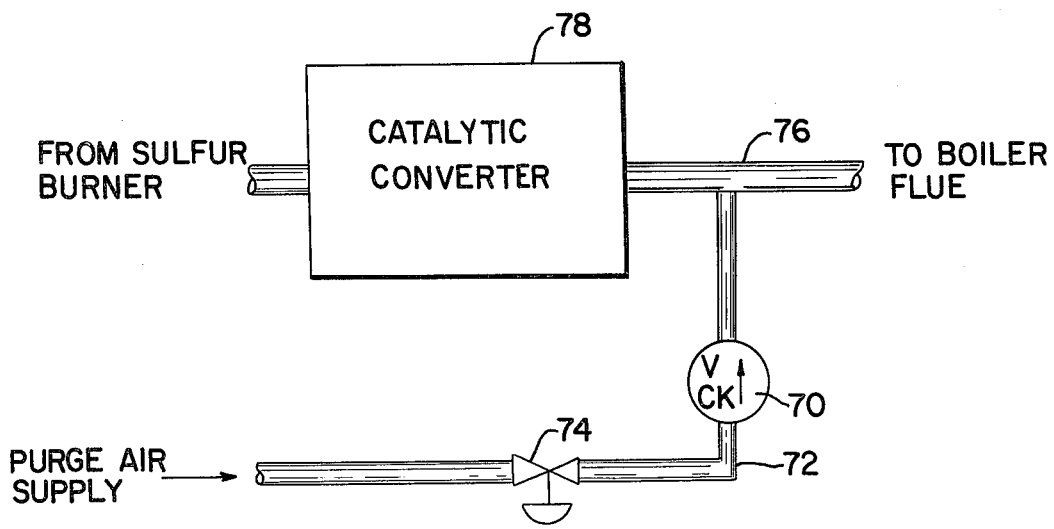

Another object of the invention is to provide such an improved purge system wherein means are provided to protect purge system components and operating personnel from damage and injury due to backflow of residual sulfur dioxide and sulfur trioxide into the purge system. These and other objects and advantages of the invention will become more readily apparent upon a reading of the following description with reference to the accompanying drawings in which:

FIG. 1 is a schematic illustration of a flue gas conditioning system which is constructed and is operative in accordance with the principles of the present invention; and FIG. 2 is a fragmentary portion of FIG. 1 showing a further aspect of the invention.

In FIG. 1 there is generally indicated at 10 a flue gas conditioning system which is constructed and is operative in accordance with the principles of the present invention. Those skilled in the art will appreciate that in general a flue gas conditioning system comprises a highly complex system which is ordinarily adapted for, but is not necessarily limited to, sulfur trioxide conditioning of fly ash particulates which are entrained in flue gas streams which emerge from fossil fuel, primarily coal, burning boilers such as boiler 12. The sulfur trioxide conditioning is completed prior to the flue gas stream entering an electrostatic precipitator and, hence, enhances removal of the fly ash by the electrostatic precipitator by conventional electrostatic precipitation techniques. For purposes of the description herein, the embodiment described is directed to sulfur trioxide conditioning of a gas stream emerging from coal burning boilers; however, this specific descriptive embodiment is not intended to unduly limit the scope of the invention described.

The flue gas conditioning system 10 comprises, in part: an air intake fan 14, preferably a constant speed fan, the inlet of which communicates with ambient air via an inlet conduit 16; a conduit 18 which communicates between the fan 14 and a sulfur burner 20; a variable temperature primary heater 22 which is disposed within conduit 18; and, as shown, a conduit 24 which communicates between the sulfur burner 20 and a catalytic converter 26. It is to be noted that in practice sulfur burner 20 and converter 26 may be combined in a unitary staged assembly; however, for purposes of clarity FIG. 1 illustrates a conduit 24 communicating between sulfur burner 20 and converter 26.

The system 10 additionally includes a liquid sulfur storage tank 28 which is in communication with the sulfur burner 20 via conduit 30. A proportional pump 32 is disposed within conduit 30 to assist in the delivery of liquid sulfur from tank 28 via conduit 30 into the burner 20. A suitable controller, such as the schematically illustrated microprocessor control shown in the hereinabove referenced pending application Ser. No. 257,343 now U.S. Pat. No. 4,333,746, receives boiler load signals from suitable boiler sensors to selectively regulate the delivery of liquid sulfur to the burner 20 according to the known percentage of sulfur content of the coal being burned.

The portion of the system 10 which is described hereinabove is generally well known in the art and is fully described in the referenced U.S. Pat. No. 3,993,429. Broadly, such portion is operative by energizing fan 14 to provide ambient air via conduit 18 to heater 22 whereat, during start-up of burner 20, the air is heated to a temperature of approximately 800° to 850° F. The hot air is then directed to the sulfur burner 20 to heat up the interior thereof to thereby result in the ignition of the liquid sulfur being delivered to burner 20 by the pump 32. The ignited sulfur rapidly oxidizes to form a sulfur dioxide and air mixture containing, for example, 5% sulfur dioxide by volume. This sulfur dioxide—air mixture then passes to the catalytic converter 26 via conduit 24 for the production of sulfur trioxide for subsequent injection via conduit 46 into the gas stream flowing within boiler flue 13 for the conditioning thereof. The specific means for injection of the sulfur trioxide into the boiler flue gas streams may be any suitable arrangement; for example, the industrial sulfur trioxide gas injection probe not shown herein, but which is fully illustrated and described in U.S. Pat. No. 4,179,071. In the flue, the injected sulfur trioxide combines with water vapor to form sulfuric acid, which then condenses on the fly ash particles to advantageously influence the surface resistivity of the ash.

Other control features of the system 10 which are fully disclosed in the referenced application Ser. No. 257,343 now U.S. Pat. No. 4,333,746 may include a suitable sensor adjacent the outlet side of the burner 20 to detect the temperature of the burner outlet mixture and suitable control means programmed to respond to a signal from such sensor for the selective modulation of heater 22 to thus regulate the output temperature of the gas stream from the burner 20 to the optimum temperature for efficient operation of the catalytic converter 26.

Inasmuch as the invention herein is primarily directed to the apparatus and method for purging a known portion of a system such as is described hereinabove under a variety of shutdown conditions, further description of such known portions is not necessary for one skilled in the art to achieve a full understanding of the invention herein. Accordingly, for a further description of the elements described hereinabove and the operation and interaction thereof, reference is hereby specifically made to U.S. Pat. Nos. 3,993,429 and 4,179,071, and to pending application Ser. No. 257,343 now U.S. Pat. No. 4,333,746.

According to the present invention, the gas conditioning system 10 includes a purge system portion generally indicated at 11 and including a suitable blower 56 whose intake communicates with the ambient atmosphere via a conduit 34 which includes an in-line air filter 36. The outlet of blower 56 communicates with a purge air delivery conduit 38. Conduit means 38 includes a T-junction 40 from which conduit legs 38a and 38b diverge for delivery of purge air to different portions of system 10. Conduit leg 38a communicates with conduit 18 at 42 upstream from sulfur burner 20, whereas conduit leg 38b communicates with conduit 46 at 44 downstream from converter 26. In order to control the flow of purge air into system 10, conduit legs 38a and 38b include respective suitable solenoid operated dampers or other remotely controllable air flow regulating valves 48a, 48b. Also included in conduit legs 38a, 38b are respective suitable one-way check valves 50a, 50b located respectively intermediate valves 48a, 48b and junction points 42, 44. Check valves 50a, 50b allow air flow only toward junction points 42, 44 as indicated by the directional arrows in the check valve symbols (FIG. 1).

Solenoid operated valves 48a, 48b are controlled by suitable control means to direct purge air flow into system 10 in conjunction with operation of purge system 11. Accordingly, purge control means 58 is provided with the following capabilities. As indicated by schematic control line 60, blower 56 is interlocked with valves 48a, 48b to assure that blower 56 is operating before either of the valves 48a, 48b opens. Valves 48a and 48b are also interlocked together as indicated by control line 62 to assure that they will not both be open at the same time. Purge control means 58 further includes valve operating means such as solenoid actuator 64 which operates in conjunction with the interlock between valves 48a, 48b to selectively open one or the other of valves 48a, 48b according to system conditions.

Other control capabilities preferably included in purge system 11 include but are not limited to the following features not shown in the drawings:

1. Blower 56 may be electrically interlocked with blower 14 to assure that purge system 11 will operate upon shutdown of blower 14;

2. Blower 56 and other purge system components may be powered by an independent first class power source to assure operation thereof in the event of abnormal sulfur burner system shutdown due to power failure;

3. Sulfur burner/converter temperature detectors may be provided to control purge system operation in response to sulfur burner or converter temperature;

4. Suitable detectors may be employed to control purge according to the conditions of sulfur burner shutdown (i.e., whether normal or emergency);

5. An automatic time delay between initiation of purge and operation of one or both of valves 48a, 48b may be provided;

6. Detectors may be utilized to control purge mode or time duration in response to the concentration of residual sulfur tioxide in the catalytic converter or downstream therefrom.

Of course, the above control functions may alternately be performed manually by operating personnel, as desired.

In operation, purge system 11 is normally off during sulfur burning and sulfur trioxide generation and injection into boiler flue 13, and valves 48a, 48b are closed.

For a positive ductwork system (positive pressure) this precludes backflow of sulfur dioxide or sulfur trioxide from the sulfur burning system into the purge system. Such backflow could conceivably reach blower 56 and ultimately backflow through filter 36 to become entrained in the ambient atmosphere near operation personnel stations. The possible consequences of such backflow include corrosion of blower 56 and injury to operating personnel.

As a backup to the anti-backflow capability of valves 48a, 48b, check valves 50a, 50b are provided to preclude backflow to valves 48a, 48b. Thus, the corrosive effects of sulfur trioxide backflow on valves 48a, 48b are eliminated. Check valves 50a, 50b also permit comparatively convenient servicing and maintenance of valves 48a, 48b. Check valves 50a, 50b also protect against sulfur trioxide backflow into the purge system in the event of purge system power failure.

In normal operation, shutdown of the sulfur burning system entails shutoff of the liquid sulfur supply followed by shutdown of blower 14 after sufficient further operation thereof to purge sulfur burner 20 and converter 26. Upon subsequent shutdown of blower 14 and closing of main air valve 17, operation of purge system 11 is initiated by start-up of blower 56. When blower 56 is up to speed and capable of supplying purge air flow, then valve 48b is opened to direct purge air flow via conduit leg 38b and into conduit 46 and thence to the sulfur trioxide injection probe (not shown) in flue 13. As valve 50a and main air valve 17 are closed, purge air backflow into converter 26 or further from junction point 44 is precluded.

In the event of an abnormal or emergency sulfur burning system shutdown, there is no opportunity for extended operation of blower 14 for effective self purging of the system. Hence, upon such occurrence, purge system 11 start-up entails start-up of blower 56 followed by opening of valve 48a to direct purge air flow via conduit leg 38a into conduit 18 at junction 42. The purge air thence flows through sulfur burner 20, conduit 24, converter 26 and conduit 44 to flue 13. As valves 17 and 48b and 50b are all closed, no other air flow path is open to the purge air. After a time delay, ½ hour for example, valve 48a is closed and valve 48b is simultaneously opened whereby purge air flow is redirected via conduit leg 38b for further purging of conduit 46 downstream of junction 44.

The disclosed initial purge air flow through burner 20 and converter 26 is of substantial significance. This initial purge air flow allows for preliminary heating of the purge air by latent or residual heat in the sulfur burner and converter to a temperature above the sulfur trioxide dew point. This permits the purge air to vaporize the residual sulfur trioxide and any trace amounts of sulfuric acid which may have already condensed in the downstream portions of the system, and to carry them into flue 13. Of course such preheating of purge air flow also precludes downstream condensation of any already vaporized sulfur trioxide and sulfuric acid.

As it is undesirable to cool sulfur burner 20 and converter 26 completely in view of subsequent start-up requirements, continuous purge via conduit leg 38a would be undesirable. Thus, after the initial purge with preheated purge air has removed substantially all residual sulfur trioxide from the system, continued purge via conduit leg 38b is maintained to protect against flue gas backflow into the sulfur burning system and to prevent clogging of the injection probe orifices by fly ash and other particulates entrained in the flue gas stream.

The above description of purge system operation is applicable to systems used in conjunction with either positive pressure or negative pressure boiler flues.

FIG. 2 illustrates an alternate aspect of the invention in which a check valve 70 is provided in a purge air line 72 between a solenoid operated purge air control valve 74 and a junction point 76 downstream of a converter 78 where purge air enters the sulfur burner system. The purge air is delivered from a purge air flow source as indicated. The purge system shown in FIG. 2 is similar to many conventional purge systems but includes the novel improvement of check valve 70 which functions in the same manner and for the same purposes as described hereinabove with reference to FIG. 1.

The description hereinabove presents a preferred embodiment of a purge system constructed in accordance with the principles of the present invention; however, it is to be understood that various modifications may be made to the embodiment described herein by those knowledgeable in the art without departing from the scope of the invention. For example, manual emergency and/or backup valves may be inserted within the varius sulfur burner system conduits where desired; the precepts of the invention may be equally applicable to other types of sulfur trioxide injection systems which utilize an air heater and a catalytic converter; various automatic sensors and/or detectors may be utilized to control the described purge system; and the like.

These and other embodiments and modifications having been envisioned and anticipated by the inventor, the invention should be construed as broadly as permitted by the scope of the claims appended hereto.

What is claimed is:

1. In a sulfur trioxide gas conditioning apparatus wherein an induced flow of heated air is directed via a flowpath extending between an inlet and outlet and from such outlet into a flue for conditioning of flue gases containing flyash by injecting a controlled amount of sulfur trioxide gaseous mixture to vary the resistivity of such flyash, such induced air flow, as it flows along said flowpath, passes through conversion means to produce an air and sulfur trioxide mixture for use in the conditioning of such flue gases and which conditioning apparatus includes a purge means for purging, on demand, at least a downstream portion thereof of sulfur trioxide gaseous mixture therefrom, the improvement in said purge means comprising: a purge air flow induction means; a first purge air conduit means for directing purge air flow into said flowpath upstream from said conversion means; second purge air flow conduit means for directing purge air flow into said flowpath downstream from said conversion means; selectively operable valve means for selectively directing purge air flow from said purge air flow induction means through said first and said second purge air flow conduit means and for selectively isolating said purge air flow induction means from said flowpath; and said selectively operable valve means includes a respectively operable valve in each of said first and second purge air flow conduit means.

2. The improvement as claimed in claim 1 wherein said conversion means includes a sulfur burner means for combustion of sulfur added thereto to produce therein an air and sulfur dioxide mixture, and a catalytic converter which receives said air and sulfur dioxide mixture to produce therefrom an air and sulfur trioxide mixture for use in the conditioning of such flue gases.

3. The improvement as claimed in claim 1 wherein each of said respective selectively operable valves offers a closed mode in which purge air flow in the respective purge air flow conduit is blocked and an open mode in which purge air flow is permitted to pass through the respective air flow conduit.

4. The improvement as claimed in claim 3 wherein each of said selectively operable valves includes a solenoid operable damper valve.

5. The improvement as claimed in claim 3 wherein said selectively operable valves are interlocked to preclude simultaneous actuation thereof to said open mode.

6. The improvement as claimed in claim 5 wherein said purge means includes means for maintaining both of said selectively operable valves in said closed mode when said purge air induction means is not operating.

7. The improvement as claimed in claim 3 wherein said selectively operable valve means further includes a one-way check valve in each of said first and said second purge air flow conduits between the respective selectively operable valves and said flowpath.

8. The improvement as claimed in claim 7 wherein said one-way check valves permit flow only in flow direction from the respective selectively operable valves toward said flow path.

9. The improvement as claimed in claim 8 wherein said purge air flow induction means includes a constant speed blower.

* * * * *